(12) United States Patent
Sadowski et al.

(10) Patent No.: US 7,924,986 B2
(45) Date of Patent: Apr. 12, 2011

(54) IVR SYSTEM MANAGER

(75) Inventors: Stephanie D. Sadowski, Charlotte, NC (US); Joseph M. Benvegnu, Littleton, CO (US)

(73) Assignee: Accenture Global Services Limited, Dublin (IE)

( * ) Notice: Subject to any disclaimer, the term of this patent is extended or adjusted under 35 U.S.C. 154(b) by 1475 days.

(21) Appl. No.: 11/342,169

(22) Filed: Jan. 27, 2006

(65) Prior Publication Data

US 2007/0192113 A1    Aug. 16, 2007

(51) Int. Cl.
H04M 11/00 (2006.01)
H04M 1/64 (2006.01)
G10L 11/00 (2006.01)

(52) U.S. Cl. .................. 379/88.18; 379/76; 704/270
(58) Field of Classification Search ............... 379/88.18; 704/270

See application file for complete search history.

(56) References Cited

U.S. PATENT DOCUMENTS

| | | | | |
|---|---|---|---|---|
| 5,758,323 A * | 5/1998 | Case | | 704/278 |
| 5,771,276 A * | 6/1998 | Wolf | | 379/88.16 |
| 5,878,423 A * | 3/1999 | Anderson et al. | | 1/1 |
| 6,014,428 A * | 1/2000 | Wolf | | 379/88.11 |
| 6,035,272 A * | 3/2000 | Nishimura et al. | | 704/258 |
| 6,101,470 A * | 8/2000 | Eide et al. | | 704/260 |
| 6,366,883 B1 * | 4/2002 | Campbell et al. | | 704/260 |
| 6,456,699 B1 * | 9/2002 | Burg et al. | | 379/88.17 |
| 6,629,087 B1 * | 9/2003 | Benson et al. | | 706/11 |
| 6,697,796 B2 * | 2/2004 | Kermani | | 1/1 |
| 6,728,682 B2 * | 4/2004 | Fasciano | | 704/278 |
| 6,823,054 B1 * | 11/2004 | Suhm et al. | | 379/134 |
| 6,834,100 B2 * | 12/2004 | Reynolds | | 379/88.16 |
| 6,862,568 B2 * | 3/2005 | Case | | 704/260 |
| 6,891,932 B2 * | 5/2005 | Bhargava et al. | | 379/88.02 |
| 6,895,084 B1 * | 5/2005 | Saylor et al. | | 379/88.22 |
| 6,950,798 B1 * | 9/2005 | Beutnagel et al. | | 704/260 |
| 6,990,450 B2 * | 1/2006 | Case et al. | | 704/260 |
| 7,003,719 B1 * | 2/2006 | Rosenoff et al. | | 715/205 |
| 7,039,585 B2 * | 5/2006 | Wilmot et al. | | 704/235 |
| 7,039,588 B2 * | 5/2006 | Okutani et al. | | 704/258 |
| 7,055,146 B1 * | 5/2006 | Durr et al. | | 717/162 |
| 7,103,158 B2 * | 9/2006 | Plan | | 379/88.23 |
| 7,107,536 B1 * | 9/2006 | Dowling | | 715/738 |
| 7,140,004 B1 * | 11/2006 | Kunins et al. | | 717/125 |
| 7,280,968 B2 * | 10/2007 | Blass | | 704/266 |
| 7,623,632 B2 * | 11/2009 | Bushey et al. | | 379/88.01 |
| 2002/0072900 A1 * | 6/2002 | Keough et al. | | 704/220 |
| 2002/0184002 A1 * | 12/2002 | Galli | | 704/7 |
| 2003/0014407 A1 * | 1/2003 | Blatter et al. | | 707/6 |
| 2003/0187656 A1 * | 10/2003 | Goose et al. | | 704/270.1 |
| 2003/0216923 A1 * | 11/2003 | Gilmore et al. | | 704/270.1 |
| 2004/0199494 A1 * | 10/2004 | Bhatt | | 707/3 |

* cited by examiner

*Primary Examiner* — Joseph T Phan
(74) *Attorney, Agent, or Firm* — Finnegan, Henderson, Farabow, Garrett & Dunner, LLP

(57) ABSTRACT

An IVR system designer receives design specification data (which may be either state definition data or IVR system document data) and stores it in a database. A design specification report can be generated based on the stored design specification data. The report may correspond to a chosen period of time or it may correspond to chosen version of the IVR system. It may provide one or more of the following: a summary of a state within the IVR system, a listing of the previous states that lead to the current state, prompts for the state, inputs for the state, a listing of decision outcomes, key performance indicator triggers for the state, global commands that are active in the state, business units for which the state is applicable, a sample dialogues listing, test scripts listing for testing the IVR system, a change history listing for the system, a design flow diagram for the system, or pseudocode listing for a portion of the system.

80 Claims, 15 Drawing Sheets

*State-by-State Design Specification Report*

PROJECT ALPHA

| | |
|---|---|
| Module: | Main Menu |
| Coverage: | Changes from 2.1 to 2.2 |
| Date: | 1 December 2005 |

FIG. 5A

CHANGE HISTORY FROM 2.1 to 2.2

| Date | State | Item | By |
|---|---|---|---|
| 3 MAR 05 | Add New Customer | Global Commands | G. Smith |
| 3 MAR 05 | Change Customer Profile | Inputs | T. Jones |
| 15 MAR 05 | 00110 Initialize | Decisions | J. Bennett |
| 17 MAR 05 | 00310 Change Services | Decisions | M. Alberg |
| 2 APR 05 | 00430 Auth Payment | Prompts | S. Bert |

FIG. 5B

GLOBAL COMMANDS SUMMARY

| State Name | State Type | Barge-In | Timeout | To Previous Menu | Help | Repeat It | Go to Main Menu | Go to Agent | Percolation |
|---|---|---|---|---|---|---|---|---|---|
| InitalizeCall | InitSession | | | | | | | | |
| WelcomeState | Audio Only | | | | | | | | |
| ChooseLanguage | Recognition | ▒ | ▒ | | ▒ | ▒ | ▒ | | |
| NewCustomer | Decision | | | | | | | | |
| ChangeProfile | Recognition | ▒ | | ▒ | ▒ | ▒ | ▒ | | |
| MakePayment | Processing | | | | | | | | |

FIG. 5C

SAMPLE DIALOGUES

| State | Condition | Content |
|---|---|---|
| NewCustomer | Current Customer = FALSE | "I do not believe you currently have an account with us. Would you like to open a new account?" |
| Change Services | Premium = Yes | "Are you sure you want to discontinue receiving premium services?" |

FIG. 5D

STATE DEFINITIONS

| AccountSummary | Process |
|---|---|
| Previous States | |
| VerifyAccount | |
| CheckBalance | |
| Decision/Process Outcome | |

| # | Condition | Go To |
|---|---|---|
| 1 | Current Due > 0 Call IVR | AmtNowDue |
| 2 | Current Due > 0 Call Agent | 05170_Step_1 |
| 3 | Current Due <= 0 | 05090_Current |
| 4 | Current Due unknown | 05170_Step_1 |

| Inputs | | | |
|---|---|---|---|
| DTMF | SPEECH | GRAMMAR | GO TO |
| 0 | Agent | Agent.gxml | 03881_ |

| Technical Activities |
|---|
| The Current_Due variable is check to determine whether the current due is equal to null and whether the balance should be played. |

| Reporting/KPIs | |
|---|---|
| Name | Description |
| Webservices_Down | Web Services Interfaces down |
| Total_Calls | Total calls entering this module |

| Notes |
|---|
| If Current Due is NOT available, then caller receives the same treatment as Current Due Not Available and Purpose = Payment in Prompt_Payment. |

FIG. 5E

| ChooseLanguage | Recognition |
|---|---|
| Previous States | |
| | |
| | |

Decision/Process Outcome

| # | Condition | Go To |
|---|---|---|
| 1 | | |
| 2 | | |
| 3 | | |
| 4 | | |

Inputs

DTMF   SPEECH   GRAMMAR   GO TO

Technical Activities

Reporting/KPIs

Name Description

Notes

FIG. 5F

| WelcomeState | | | Audio Only |
|---|---|---|---|
| Previous States | | | |
| | | | |
| | | | |
| Prompts | | | |
| *Cond.* | *Content* | *Notes* | *Filename* |
| | | | |
| | | | |
| | | | |
| Decision/Process Outcome | | | |
| # | Condition | | Go To |
| 1 | | | |
| 2 | | | |
| 3 | | | |
| 4 | | | |
| Technical Activities | | | |
| | | | |
| Notes | | | |
| | | | |

FIG. 5G

APPENDIX

*Check_Due_Date API*

| Input | |
|---|---|
| Output | |

*Pseudo Code for WelcomeState*

| |
|---|
| |
| |
| |

FIG. 5H

IVR SYSTEM MANAGER

BACKGROUND OF THE INVENTION

1. Field of Invention

The present invention relates to interactive voice response ("IVR") systems, and more particularly to maintaining the IVR system specification, which includes both the data for the various state definitions as well as documentation for the IVR system.

2. Description of Related Art

Interactive Voice Response ("IVR") systems allow a consumer to use a telephone keypad or voice commands to receive self service with a company's contact center without assistance from a contact center agent. For example, a customer of a credit card company may call its toll-free number, type or say her account number and a PIN, and hear information about her current balance, available credit, and next payment due date. By enabling customers to help themselves, IVR systems enable a contact center to handle more customers at one time than the available contact center agents could handle directly.

While IVR systems provide useful contact center functionality, they are not simple for a company to design, build, and maintain. IVR systems often have complicated, web-like, structures of content and numerous user touch-points. There are often different owners (including business and IT personnel) within a company for the various types of content needed to operate an IVR system. These business owners use differing techniques for documenting and maintaining their piece of the system. For example, the system test team may keep the scripts necessary for system and regression testing in one or more spreadsheets. The marketing team may use Visio or another graphical application to visually show the design flow for the customer experience when using the IVR system. A business analyst may maintain a word processing document to capture the details for each step or menu concerning payments. Other groups, with overlapping responsibilities, may use other forms of documentation.

The complicated interconnections within the IVR system, the supporting specifications for the system and the fact that the system is owned by a wide-spread group of business owners makes changing the system difficult. Even a small change to the IVR system requires multiple contacts to the business owners, who then are entrusted to each update their own documents to reflect the change. When changes are made to the system, its complicated nature makes it difficult to closely track the changes over time. The IVR administrator may try to manually compile a document of changes made to the IVR system between two versions. However, this manual process is inconvenient, time consuming, and ripe for mistakes.

FIG. 1 illustrates the prior art's approach to maintaining the design of an IVR system. In such systems, a single change that is to introduced to the IVR requires manual changes 105 to one or more of the following types of IVR system documentation: the design flow document 110, the test scripts document 120, the change history document 125, the recording prompt list document 130, the state definition details document 135, and/or the sample dialogues document 140. Some of these (110 for example) may be VISIO, POWERPOINT or other graphical files. Some (120 for example) may be EXCEL or other spreadsheets. Some of these documents (125, 130, 135, 140 for example) may be WORD or other word processing documents. Of course, this list of documentation is merely representative of documents that may be maintained. It is to be understood that different companies may maintain information about their IVR systems using different types of documents than the representative ones shown in FIG. 1. Regardless, if any of these manual changes 105 are missed, the reference data is no longer accurate. Since the various documents are owned by different groups, it is not difficult for this to happen.

What is needed is a system for centralizing the IVR system specification for an IVR system that is usually stored in several different applications, such as word processor, a spreadsheet application and a graphical application. What is a needed is a system that enables a change in the IVR system (whether it be a change to some state definition data or a change to IVR system documentation) to be entered once and yet reflected throughout the data and documentation for the system. Finally, what is needed is a system for tracking changes that can easily and accurately report modifications made to the IVR system specification for a specific time period or between two specified versions.

BRIEF SUMMARY OF THE INVENTION

According to one aspect of the invention, a method and system for designing an IVR system receives IVR system specification data from one or more computer users, which is then stored in a database. The IVR system specification data may be either state definition data or IVR system documentation data. A design specification report can be generated based on the stored state definition data and IVR system documentation. The system may also receive and store state definition design changes or IVR system documentation changes for the IVR system so that a subsequently run report reflects the design or documentation changes.

According to another aspect of the invention, the design specification report may correspond to a chosen period of time or it may correspond to chosen version of the IVR system.

According to another aspect of the invention, the design specification report may provide one or more of the following: a summary of the definition for a state within the IVR system, a listing of the previous states that lead to the current state, prompts for the state, inputs for the state, a listing of decision outcomes, key performance indicator triggers for the state, global commands that are active in the state, business units for which the state is applicable, a sample dialogues listing, test scripts listing for testing the IVR system, a change history listing for the IVR system, a design flow diagram for the IVR system, or pseudo-code listing for a portion of the IVR system.

DETAILED DESCRIPTION OF THE INVENTION

In the following detailed description of the preferred embodiments of the invention, reference is made to the accompanying drawings in which is shown by way of illustration specific embodiments in which the invention may be practiced. It is to be understood that other embodiments may be utilized and structural changes may be made without departing from the scope of the present invention.

Figure 1:
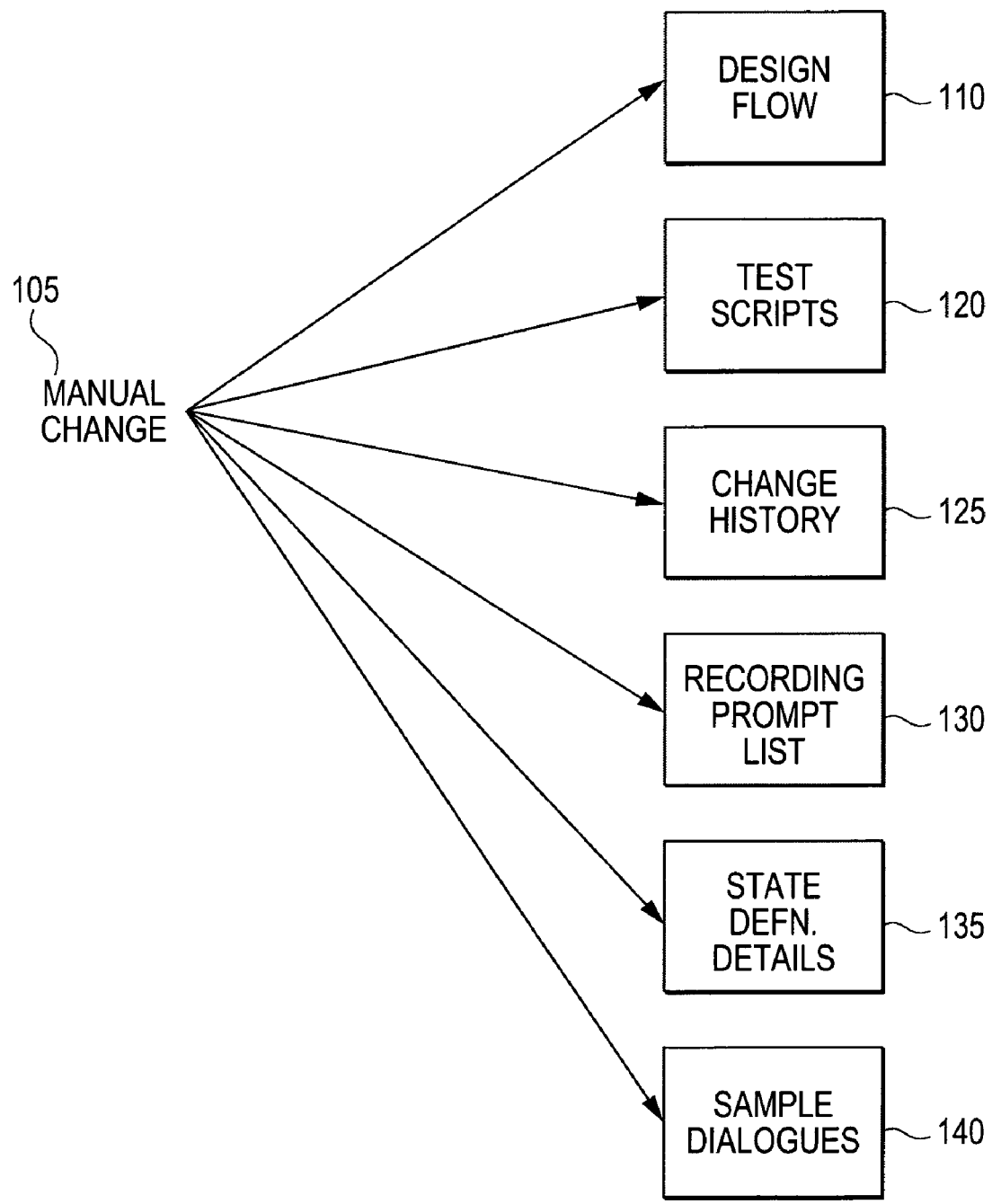
FIG. 1 illustrates the prior art's approach to maintaining the IVR system.
Figure 2:
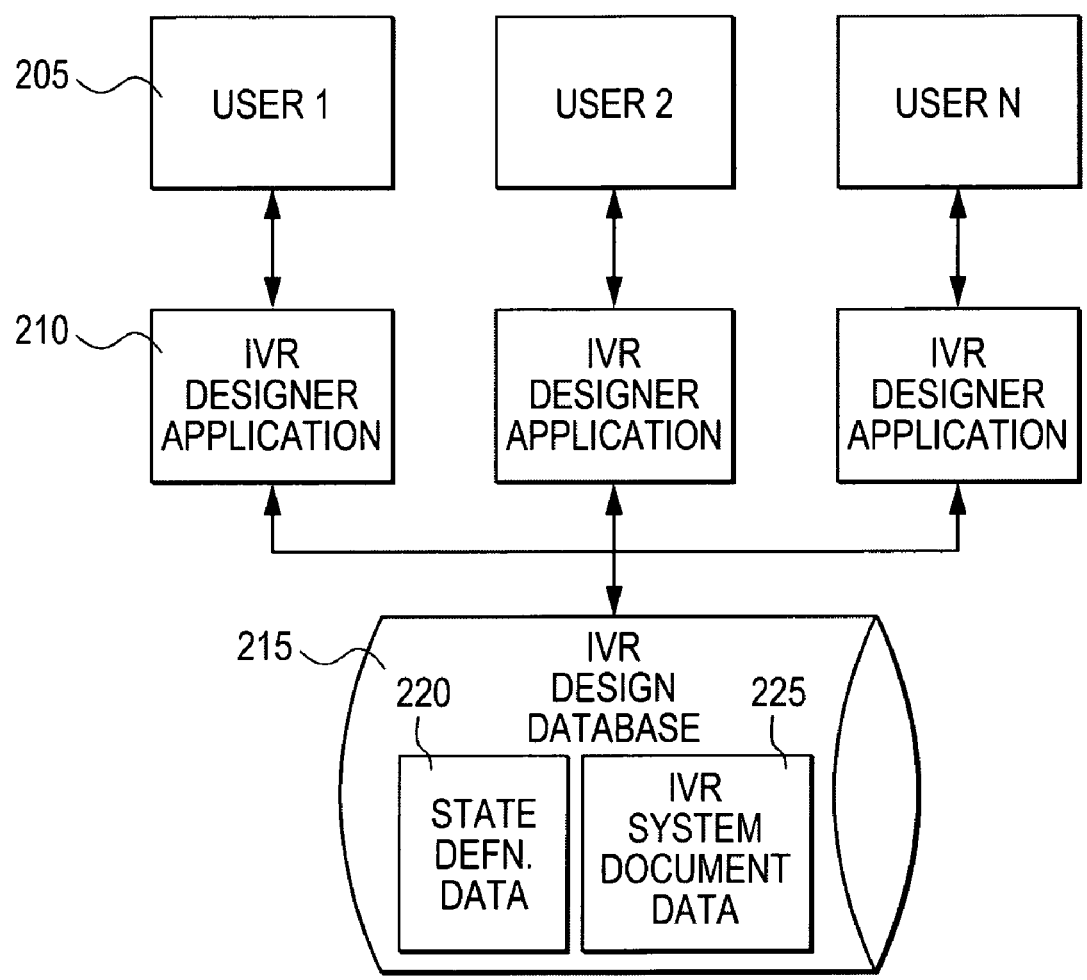
FIG. 2 is a block diagram of one embodiment of the invention.
Figure 3:
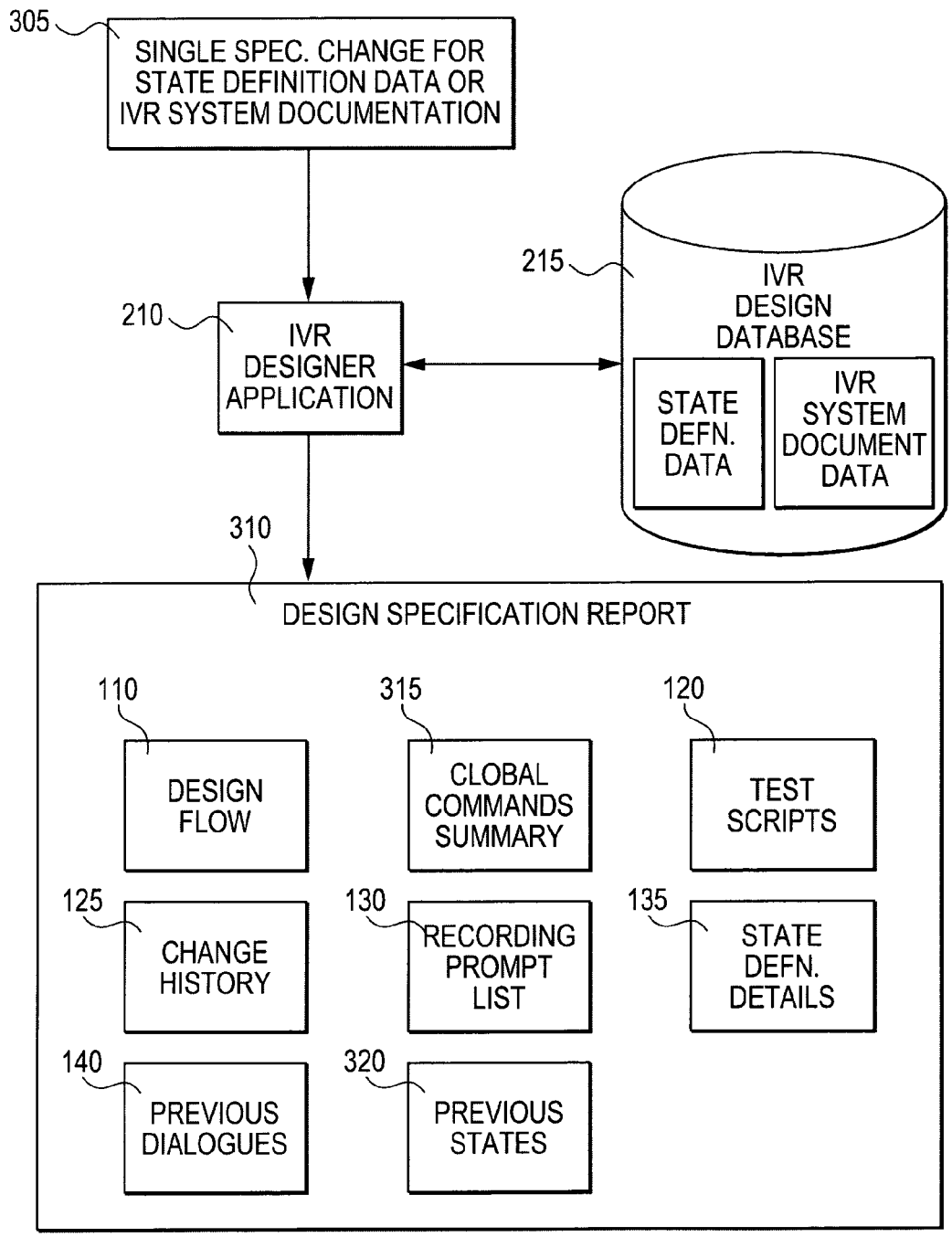
FIG. 3 illustrates the invention's approach to maintaining the design of an IVR system specification.

In one embodiment, the invention can be implemented as a series of users using computers 205 to access an IVR designer application 210 (either locally or over a network) that stores IVR system specification data in an IVR design database 215. The IVR design database 215 includes state definition data 220 and IVR system documentation data 225. FIG. 2 is a block diagram for such an embodiment. FIG. 3 illustrates the invention's approach to maintaining the IVR system specification. The prior art system shown in FIG. 1 required multiple manual changes to describe a single change in the IVR system. As shown in FIG. 3, a single IVR specification change 305 may be entered in the IVR designer application 210. This IVR specification change may be concerned with either state definition data and/or IVR system documentation. The application 210 can then generate a design specification report 310. This report may contain enhanced versions of the one or more design specification reports used in the prior art, such as: the design flow document 110, the global commands summary document 315, the test scripts document 120, the change history document 125, the recording prompt list document 130, the state details document 135, the sample dialogues document 140 and the previous states document 320.

The invention offers several advantages over prior methods of maintaining IVR system specification data. In one real life implementation, the invention reduces design time by 10-15%. It enables faster turnaround on updates for business reviews and improves documentation accuracy by 300%. The test script creation phase is reduced by 40-50% and initial code generation time is reduced by 10%.

As one skilled in the art will recognize, the IVR designer application 210 can be developed using one of many types of databases and database interfaces. For example, the ACCESS database program developed by MICROSOFT can be used. In another embodiment, an ORACLE database may be accessed via a GUI that is custom-built using JAVA. One skilled in the art will recognize that there are many approaches to take to build the present invention.

Figure 4:
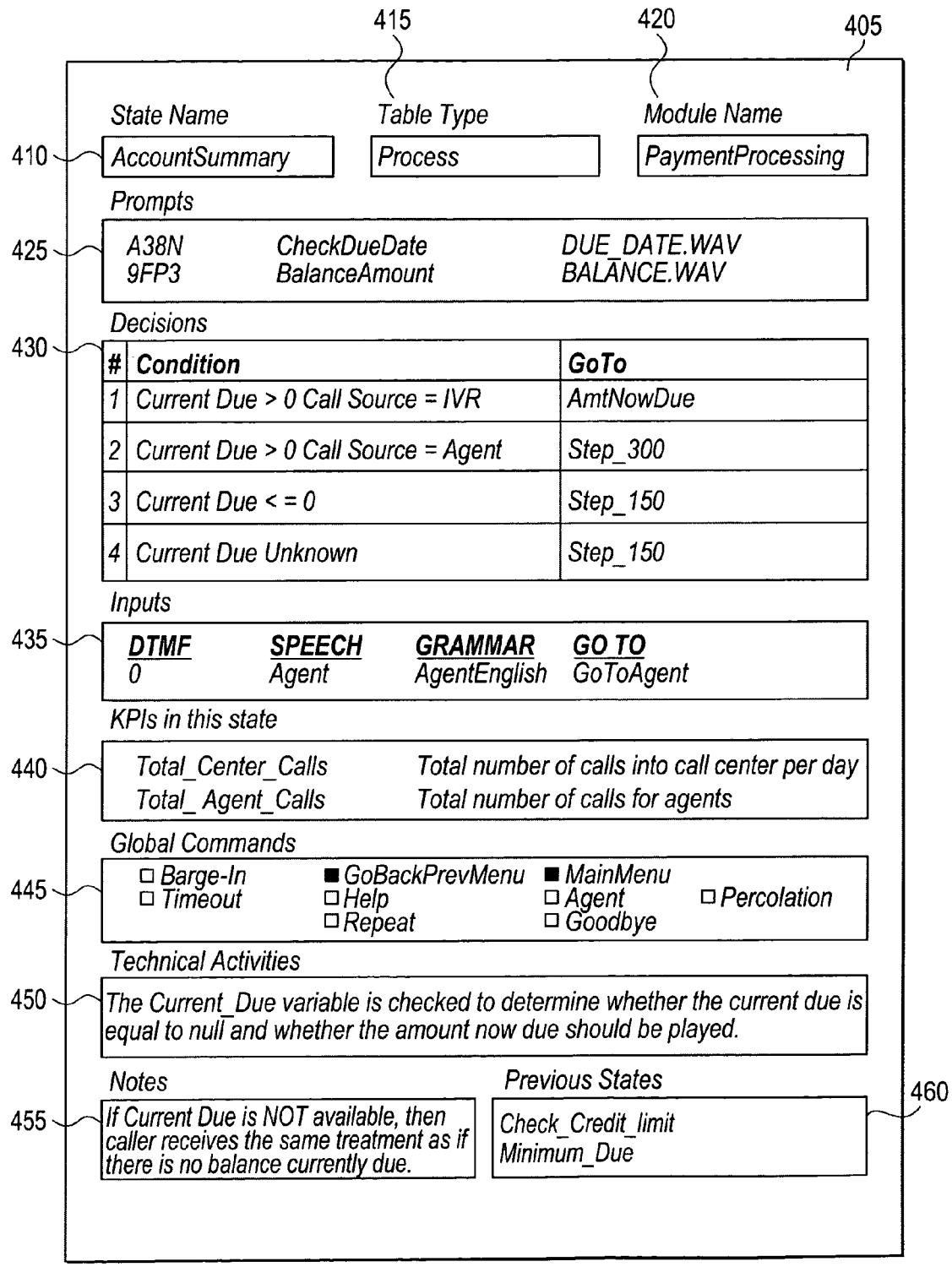
FIG. 4 illustrates a computer screen that allows state definition information to be viewed, and modified.

In an embodiment using MICROSOFT ACCESS, FIG. 4 illustrates a computer screen 405 that allows state definition data to be viewed and modified. In this embodiment, each state of the IVR system is described centrally through such a screen 405. (One skilled in the art will recognize that there are many approaches in implementing the present invention in a database and presenting the data to the user.) In FIG. 4, each IVR state is assigned a state name 410 and a type 415. The type classifies the state. For example, a state may be only audio that is played to the customer. Or the state may be a decision point. Yet another type of state is a call to the database to retrieve or store data.

The module to which the state is associated is also chosen 420. The module is a logical grouping of states, such as "main menu" or "payment". The screen also includes a prompt section 425 lists details for the prompts that are present in the state. For example, the prompts may be stored as WAV files that are played to the customer.

The decisions section 430 lists the decision rules that the IVR implements for the current state. The type of the state (see element 415) dictates the type of decisions that are available. For a decision-style state, the decisions 430 show conditions that cause movement to other states in the system. The decisions section 430 for an audio state lists which of the pre-recorded prompts are played. If the state is a call to the database, the decisions 430 are what action to take based on the results of the database query.

The inputs section 435 details the keypad entries or voice commands, if any, that are available in the current state. In FIG. 4, the GoToAgent state allows the customer to press "0" to be transferred to an agent.

The key performance indicators (KPIs) section 440 documents the KPIs that are captured based on data from the present state.

The next section lists the available global commands 445. Global commands are those commands that are widely available in the IVR system. For example, "main menu", "help" and "operator" may be global commands. While these commands are widespread, they are not available everywhere. For example, in the middle of a transaction, the IVR may not accept a command to jump to the main menu. The global commands section 445 of FIG. 4 documents which of the commands are available for the present state. The global commands section 445 is not something that was maintained in prior systems.

The technical activities section 450 lists technical information about the state. The notes section 455 allows users to keep track of notes for the state. These sections 450 and 445 may include a high level summary of what the state accomplishes. One of these sections may document which web services are used in connection with the state. One skilled in the art will recognize that other types of data may be stored here.

The previous states section 460 shows, based on the inputs and decisions, which states can cause a customer to enter the current state. This is important to know in order to fully understand how and why the state is being presented to the customer.

Figure 5I:
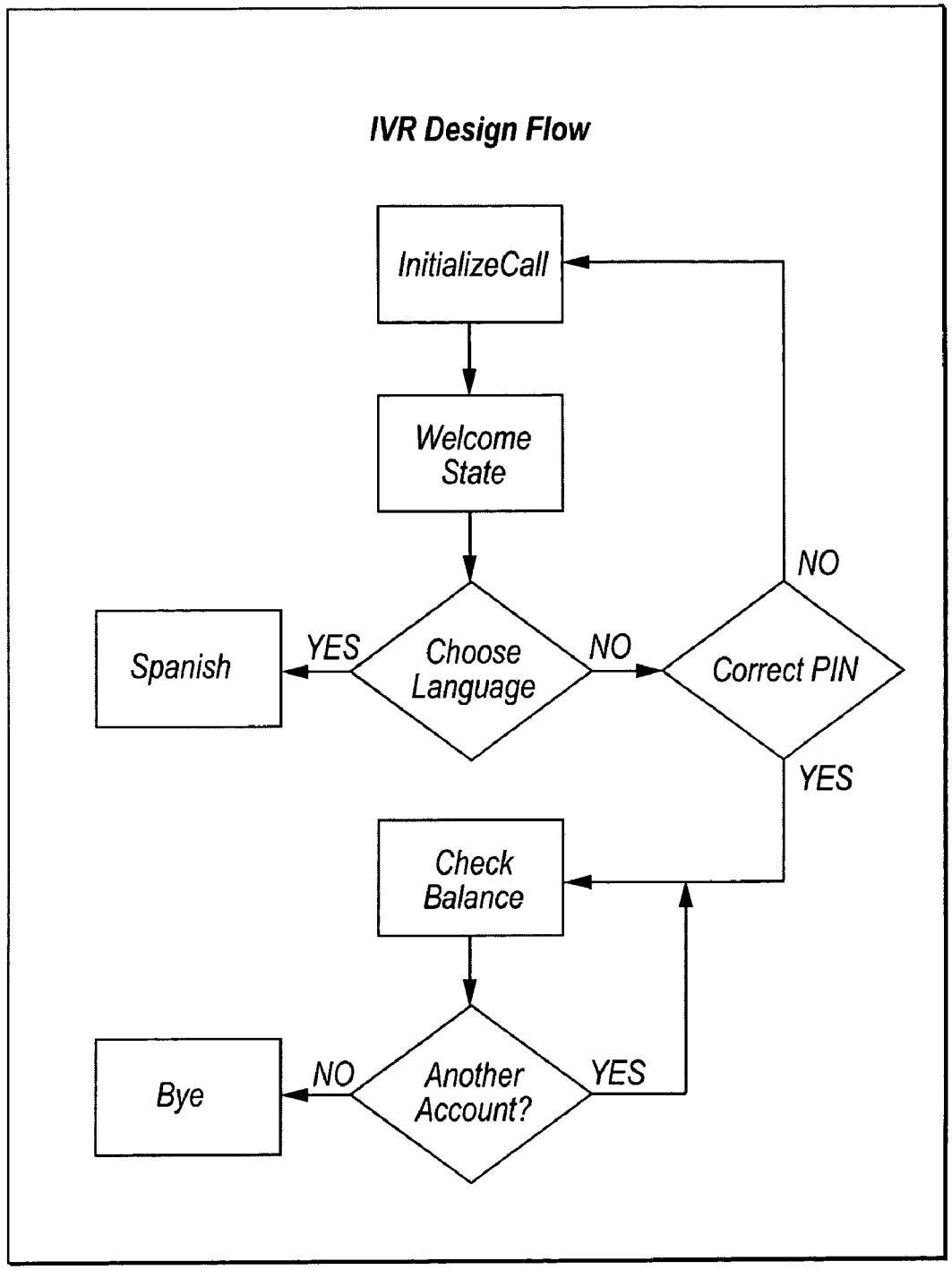
FIG. 5 (5A-5I) is a mock-up of a design specification report 310.

The screen of FIG. 4 summarizes data for a particular state in the IVR system. FIG. 5 illustrates a hypothetical IVR design specification report 310 generated by the present invention's application 210 for reporting on the definition data for one or more states, or for reporting various IVR system documentation. It is important to realize that FIG. 5 (consisting of FIGS. 5A through 5I) is a mock-up of a report to demonstrate to the reader the type of information that can be reported from the IVR design database 215. While the report mocked up in FIG. 5 includes a change history 125, a global commands summary 115, sample dialogues 140, state definition summaries for each state in the module 135 and an appendix, in a real application, the design specification report 310 may include only sections that contain data relevant to the module being reported on, or other those sections that a particular user wishes to generate. For example, the user may choose to generate just a state definitions section 135 or the sample dialogues section 140, for example. It is also clear to one skilled in the art that the design specification report 310 can be formatted in numerous ways.

In some embodiments, the user may choose a beginning and ending version. The IVR designer application 210 generates the report 310 showing only those changes that were introduced between the beginning and ending versions of the IVR system. In other embodiments, the user may choose a beginning and ending date. The report 310 can be run to show changes introduced between these specific beginning and ending dates. The report in FIG. 5 shows only changes made between system version 2.1 and system version 2.2 (see, FIG. 5A).

FIG. 5B is the change history report 125 that can be formatted to summarize changes made to the IVR system specification (i.e., either the state definition data or the IVR system documentation). In this example, it can readily be seen that the global commands for the "Add New Customer" state and the inputs for the "Change Customer Profile" state were both modified on the third of March.

FIG. 5C summarize the global commands for the various states. In this example, it is shown that the "help" command is only available when in state ChooseLanguage and ChangeProfile states.

FIG. 5D is the sample dialogues report 140. It can summarize the dialogues used in the system, which IVR states the dialogues are connected to, and what conditions must be present for the dialogues to play. For example, if the user is in the ChangeServices state and has indicated that she wants to stop her premium service, the IVR system may ask "Are you sure you want to discontinue receiving the premium services?"

FIGS. 5E, 5G and 5G form the state details summary report 135. In this example, three states (i.e., Account Summary, ChooseLanguage and WelcomeState) are included. FIG. 5H is the appendix, which may include other information. In the example shown, API information is included as well as pseudo-code for the WelcomeState.

FIG. 5I is the design flow report 110, which may graphically display the customer experience flow of the system. In some embodiments, this report may insert a VISIO or other graphic file that is produced manually. In other embodiments, the IVR designer application 210 may include functionality to push all relevant changes from its database to a graphics program so that the design flow 110 is automatically changed which each changed introduced by the users.

Figures 6, 6A:
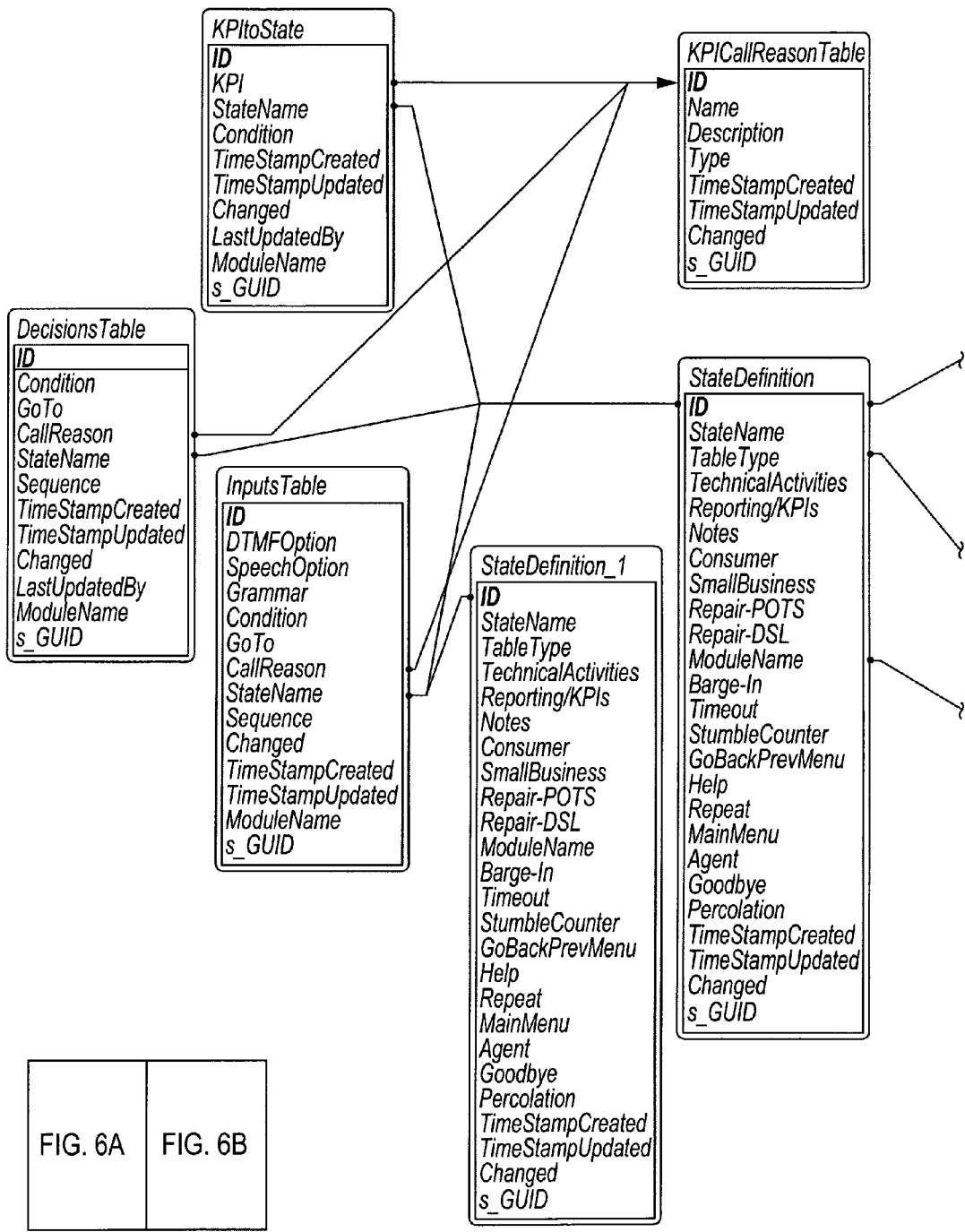
FIG. 6 is diagram showing the database tables for one embodiment of the invention.
Figure 6B:
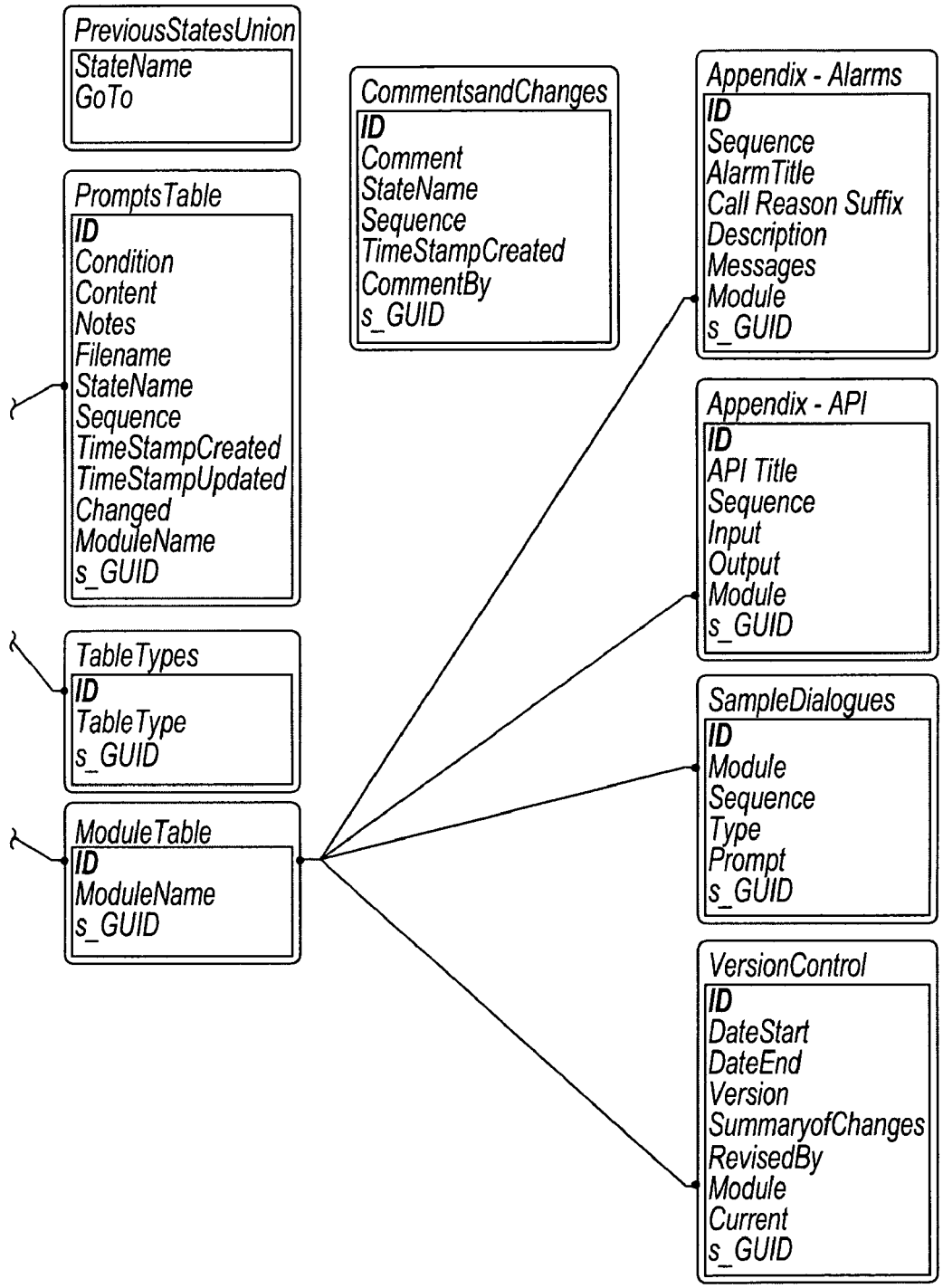

As has been discussed above, the design specification report 310 in FIG. 5 is generated based on data in an ACCESS or other database 215. FIG. 6 is diagram showing the database tables for one embodiment of the invention. In other embodiments, other tables and table structures can be developed. One skilled in the art will recognize that in the embodiment shown in FIG. 6, the StateDefinition table stores the primary information for each IVR state, and that the other tables store information regarding the prompts, KPIs, Inputs, etc. Forms (such as the one shown in FIG. 4), queries and reports (such as FIG. 5) can be built based on these database tables to enable users to maintain and document IVR system specification.

What is claimed is:

1. A computer-implemented method for maintaining Interactive Voice Response (IVR) system specification information for an IVR system, comprising:
    receiving design specification data for the IVR system from a first computer user, where the design specification data is state definition data or IVR system documentation data;
    storing the design specification data in a database;
    receiving a change to the design specification data from a second computer user;
    storing the change to the design specification data in the database; and
    generating a design specification report from the stored design specification data,
    wherein the design specification report lists a design change in the IVR system corresponding to the change in the design specification data.

2. The method from claim 1, wherein the design specification report corresponds to a period of time chosen by the second computer user.

3. The method from claim 1, wherein the design specification report corresponds to a period of time from a beginning system version chosen by the second computer user to an ending system version chosen by the second computer user.

4. The method from claim 1, wherein the design specification data is received from a plurality of computer users.

5. The method from claim 1, wherein the design specification report comprises a state details report that summarizes at least one state for the IVR system.

6. The method from claim 5, wherein the state details report comprises a listing of previous states that lead to the at least one state.

7. The method from claim 5, wherein the state details report comprises a listing of prompts.

8. The method from claim 5, wherein the state details report comprises a listing of inputs.

9. The method from claim 5, wherein the state details report comprises a listing of decision outcomes.

10. The method from claim 5, wherein the state details report lists key performance indicator triggers for the state.

11. The method from claim 5, wherein the state details report indicates global commands that are active in the at least one state.

12. The method from claim 5, wherein the state details report indicates business units for which the at least one state is applicable.

13. The method from claim 1, wherein the design specification report comprises a sample dialogues listing for the IVR system.

14. The method from claim 1, wherein the design specification report comprises a test scripts listing for testing the IVR system.

15. The method from claim 1, wherein the design specification report comprises a change history listing for the IVR system.

16. The method from claim 15, wherein the change history listing corresponds to a period of time chosen by the second computer user.

17. The method from claim 15, wherein the change history listing corresponds to a period of time from a beginning system version chosen by the second computer user to an ending system version chosen by the second computer user.

18. The method from claim 1, wherein the design specification report comprises a global commands summary.

19. The method from claim 1, wherein the design specification report comprises a design flow diagram for the IVR system.

20. The method from claim 1, wherein the design specification report comprises a pseudo-code listing for a portion of the IVR system.

21. A system for maintaining Interactive Voice Response (IVR) system specification information for an IVR system, comprising:
    a data receiver for receiving design specification data for the IVR system from a first computer user, where the design specification data is state definition data or IVR system documentation data;
    a database for storing the design specification data;
    a change receiver for receiving a change to the design specification data from a second computer user and storing the change to the design specification data in the database; and
    a report generator for generating a design specification report from the stored design specification data, wherein the design specification report lists a design change in the IVR system corresponding to the change in the design specification data.

22. The system from claim 21, wherein the design specification report corresponds to a period of time chosen by the second computer user.

23. The system from claim 21, wherein the design specification report corresponds to a period of time from a beginning system version chosen by the second computer user to an ending system version chosen by the second computer user.

24. The system from claim 21, wherein the design specification data is received from a plurality of computer users.

25. The system from claim 21, wherein the design specification report comprises a state details report that summarizes at least one state for the IVR system.

26. The system from claim 25, wherein the state details report comprises a listing of previous states that lead to the at least one state.

27. The system from claim 25, wherein the state details report comprises a listing of prompts.

28. The system from claim 25, wherein the state details report comprises a listing of inputs.

29. The system from claim 25, wherein the state details report comprises a listing of decision outcomes.

30. The system from claim 25, wherein the state details report lists key performance indicator triggers for the state.

31. The system from claim 25, wherein the state details report indicates global commands that are active in the at least one state.

32. The system from claim 25, wherein the state details report indicates business units for which the at least one state is applicable.

33. The system from claim 21, wherein the design specification report comprises a sample dialogues listing for the IVR system.

34. The system from claim 21, wherein the design specification report comprises a test scripts listing for testing the IVR system.

35. The system from claim 21, wherein the design specification report comprises a change history listing for the IVR system.

36. The system from claim 35, wherein the change history listing corresponds to a period of time chosen by the second computer user.

37. The system from claim 35, wherein the change history listing corresponds to a period of time from a beginning system version chosen by the second computer user to an ending system version chosen by the second computer user.

38. The system from claim 21, wherein the design specification report comprises a global commands summary.

39. The system from claim 21, wherein the design specification report comprises a design flow diagram for the IVR system.

40. The system from claim 21, wherein the design specification report comprises a pseudo-code listing for a portion of the IVR system.

41. A computer program product, tangibly embodied in a computer-readable storage medium, for maintaining Interactive Voice Response (IVR) system specification information for an IVR system, and containing instructions that, when executed on a processor, perform a method comprising:
receiving design specification data for the IVR system from a first computer user, where the design specification data is state definition data or IVR system documentation data;
storing the design specification data in a database;
receiving a change to the design specification data from a second computer user;
storing the change to the design specification data in the database; and
generating a design specification report from the stored design specification data, wherein the design specification report lists a design change in the IVR system corresponding to the change in the design specification data.

42. The computer program product from claim 41, wherein the design specification report corresponds to a period of time chosen by the second computer user.

43. The computer program product from claim 41, wherein the design specification report corresponds to a period of time from a beginning system version chosen by the second computer user to an ending system version chosen by the second computer user.

44. The computer program product from claim 41, wherein the state definition data is received from a plurality of computer users.

45. The computer program product from claim 41, wherein the design specification report comprises a state details report that summarizes at least one state for the IVR system.

46. The computer program product from claim 45, wherein the state details report comprises a listing of previous states that lead to the at least one state.

47. The computer program product from claim 45, wherein the state details report comprises a listing of prompts.

48. The computer program product from claim 45, wherein the state details report comprises a listing of inputs.

49. The computer program product from claim 45, wherein the state details report comprises a listing of decision outcomes.

50. The computer program product from claim 45, wherein the state details report lists key performance indicator triggers for the state.

51. The computer program product from claim 45, wherein the state details report indicates global commands that are active in the at least one state.

52. The computer program product from claim 45, wherein the state details report indicates business units for which the at least one state is applicable.

53. The computer program product from claim 41, wherein the design specification report comprises a sample dialogues listing for the IVR system.

54. The computer program product from claim 41, wherein the design specification report comprises a test scripts listing for testing the IVR system.

55. The computer program product from claim 41, wherein the design specification report comprises a change history listing for the IVR system.

56. The computer program product from claim 55, wherein the change history listing corresponds to a period of time chosen by the second computer user.

57. The computer program product from claim 55, wherein the change history listing corresponds to a period of time from a beginning system version chosen by the second computer user to an ending system version chosen by the second computer user.

58. The computer program product from claim 41, wherein the design specification report comprises a global commands summary.

59. The computer program product from claim 41, wherein the design specification report comprises a design flow diagram for the IVR system.

60. The computer program product from claim 41, wherein the design specification report comprises a pseudo-code listing for a portion of the IVR system.

61. A system for maintaining Interactive Voice Response (IVR) system specification information for an IVR system, comprising:

means for receiving design specification data for the IVR system from a first computer user, where the design specification data is state definition data or IVR system documentation data;

means for receiving a change to the design specification data from a second computer user;

means for storing the design specification data and the change to the design specification data; and means for generating a design specification report from the stored design specification data, wherein the design specification report lists a design change in the IVR system corresponding to the change in the design specification data.

62. The system from claim 61, wherein the design specification report corresponds to a period of time chosen by the second computer user.

63. The system from claim 61, wherein the design specification report corresponds to a period of time from a beginning system version chosen by the second computer user to an ending system version chosen by the second computer user.

64. The system from claim 61, wherein the state definition data is received from a plurality of computer users.

65. The system from claim 61, wherein the design specification report comprises a state details report that summarizes at least one state for the IVR system.

66. The system from claim 65, wherein the state details report comprises a listing of previous states that lead to the at least one state.

67. The system from claim 65, wherein the state details report comprises a listing of prompts.

68. The system from claim 65, wherein the state details report comprises a listing of inputs.

69. The system from claim 65, wherein the state details report comprises a listing of decision outcomes.

70. The system from claim 65, wherein the state details report lists key performance indicator triggers for the state.

71. The system from claim 65, wherein the state details report indicates global commands that are active in the at least one state.

72. The system from claim 65, wherein the state details report indicates business units for which the at least one state is applicable.

73. The system from claim 61, wherein the design specification report comprises a sample dialogues listing for the IVR system.

74. The system from claim 61, wherein the design specification report comprises a test scripts listing for testing the IVR system.

75. The system from claim 61, wherein the design specification report comprises a change history listing for the IVR system.

76. The system from claim 75, wherein the change history listing corresponds to a period of time chosen by the second computer user.

77. The system from claim 75, wherein the change history listing corresponds to a period of time from a beginning system version chosen by the second computer user to an ending system version chosen by the second computer user.

78. The system from claim 61, wherein the design specification report comprises a global commands summary.

79. The system from claim 61, wherein the design specification report comprises a design flow diagram for the IVR system.

80. The system from claim 61, wherein the design specification report comprises a pseudo-code listing for a portion of the IVR system.

* * * * *